(12) United States Patent
Cha et al.

(10) Patent No.: US 10,760,623 B2
(45) Date of Patent: Sep. 1, 2020

(54) VISCOUS CLUTCH

(71) Applicant: COOLING SYSTEM CO., LTD., Gimhae-si (KR)

(72) Inventors: Jung Ok Cha, Gimhae-si (KR); Bong Ku Choi, Gimhae-si (KR); Han Hong Lee, Incheon (KR)

(*) Notice: Subject to any disclaimer, the term of this patent is extended or adjusted under 35 U.S.C. 154(b) by 50 days.

(21) Appl. No.: 16/327,807

(22) PCT Filed: Aug. 22, 2017

(86) PCT No.: PCT/KR2017/009136
§ 371 (c)(1),
(2) Date: Feb. 22, 2019

(87) PCT Pub. No.: WO2018/043980
PCT Pub. Date: Mar. 8, 2018

(65) Prior Publication Data
US 2019/0186556 A1 Jun. 20, 2019

(30) Foreign Application Priority Data

Aug. 30, 2016 (KR) .......................... 10-2016-0110759
Apr. 10, 2017 (KR) .......................... 10-2017-0045813

(51) Int. Cl.
*F16D 35/00* (2006.01)
*F16D 35/02* (2006.01)
*F16D 33/00* (2006.01)

(52) U.S. Cl.
CPC ............ *F16D 35/024* (2013.01); *F16D 33/00* (2013.01); *F16D 35/005* (2013.01); *F16D 35/02* (2013.01);
(Continued)

(58) Field of Classification Search
CPC ........ F16D 35/024; F16D 35/02; F16D 33/00; F16D 35/005; F16D 35/027;
(Continued)

(56) References Cited

U.S. PATENT DOCUMENTS

| 2009/0084650 A1* | 4/2009 | Hennessy | ............. F16D 35/024 |
| | | | 192/58.61 |
| 2016/0003311 A1* | 1/2016 | Krammer | ................ F16D 35/02 |
| | | | 192/58.8 |
| 2018/0274602 A1* | 9/2018 | Hennessy | ............... F16D 35/02 |

FOREIGN PATENT DOCUMENTS

| JP | 2006-071100 | 3/2006 |
| JP | 4117791 | 7/2008 |

(Continued)

OTHER PUBLICATIONS

English Specification of 10-0370445.
(Continued)

*Primary Examiner* — David J Hlavka
(74) *Attorney, Agent, or Firm* — Antonio Ha & U.S. Patent, LLC

(57) ABSTRACT

A viscous clutch according to the present invention, which is composed of a main body having a fluid storage chamber of a concave shape formed at a central portion thereof and a cover having a concave fluid operation chamber formed at a central portion thereof, comprises: a fan housing in which the main body is stacked on an upper side of the cover so that an opening of the fluid operation chamber can be covered; a drive shaft which extends in a vertical direction and has a lower end inserted through a bottom plate of the main body; a rotor fixedly coupled to the lower end of the drive shaft so as to be rotatable in the fluid operation chamber; a rotary assembly integrally coupled to the main body so as to cover an opening of the fluid storage chamber; a coil core mounted on an upper surface of the rotary assembly and generating an
(Continued)

electromagnetic force when an electric current is applied from the outside; and a valve assembly for opening or closing a fluid outlet according to whether or not an electric current is applied to the coil core.

7 Claims, 8 Drawing Sheets

(52) U.S. Cl.
CPC ........ *F16D 35/027* (2013.01); *F16D 2300/14* (2013.01); *F16D 2500/1022* (2013.01); *F16D 2500/10468* (2013.01)

(58) Field of Classification Search
CPC ......... F16D 2300/14; F16D 2500/1022; F16D 2500/10468; F16D 35/021
See application file for complete search history.

(56) References Cited

FOREIGN PATENT DOCUMENTS

| KR | 10-0370445 | 2/2003 |
|----|------------|--------|
| KR | 10-2009-0059482 | 6/2009 |
| KR | 10-1305399 | 9/2013 |

OTHER PUBLICATIONS

English Specification of 10-1305399.
English Specification of 10-2009-0059482.
English Specification of 2006-071100.
English Specification of 4117791.

\* cited by examiner

VISCOUS CLUTCH

TECHNICAL FIELD

The present invention relates to a viscous clutch that turns on and off power transfer by the viscosity of fluid and, more specifically, to a viscous clutch in which an elastic means of a valve assembly is rotated by electromagnetic force to open or close the fluid outlet, thereby providing an accurate and superior clutch response.

BACKGROUND ART

A clutch is a device which is controlled by, e.g., variations in the engine driving condition of vehicle. There are provided clutches which open or close valves typically in an electromagnetic manner.

Conventional electromagnetic clutches are configured to freely and properly control the fan rotating speed by precisely adjusting the fluid flux according to various operation conditions in a simplified structure capable of reducing power consumption while operating valves using an electromagnetic force created by an electromagnet (Korean Patent No. 10-0370445).

Such a conventional electromagnetic clutch is operated to close the fluid outlet of the valve when electric current is supplied to the electromagnet and open the fluid outlet of the valve when the supply of electric current is cut off. To ensure that the valve is operated so, a separate permanent magnet is inevitably required, which restricts the simplification of the internal structure.

Further, conventional clutches are configured to allow an elastic means to directly open and close the fluid outlet. Since the elastic means is made of metal, such as carbon steel, it is difficult to make sure the opening and closing of the fluid outlet.

Prior technical documents in the art to which the present invention pertains include Korean Patent No. 10-0370445 and Korean Patent No. 10-1305399.

DETAILED DESCRIPTION OF THE INVENTION

Technical Problem

The present invention has been proposed to address the foregoing problems and aims to provide a viscous clutch capable of stably opening and closing the fluid outlet by the electromagnetic force of an electromagnet without the need for a separate permanent magnet and providing enhanced opening/closing reliability of fluid outlet.

Technical Solution

To achieve the foregoing objects, according to the present invention, a viscous clutch comprises a fan housing including a main body and a cover, the main body including a fluid storage chamber formed in a middle portion thereof and a fluid outlet and a fluid return hole formed in a side wall of the fluid storage chamber, the cover including a concave fluid operating chamber formed in a middle portion thereof, the main body laid over the cover to cover an opening of the fluid operating chamber; a driving shaft extending in an upper or lower direction thereof and mounted to pass through a bottom plate of the main body; a rotor fastened to a lower end of the driving shaft to be able to rotate in the fluid operating chamber; a rotating assembly integrally coupled with the main body to cover the opening of the fluid storage chamber; a coil core seated on an upper surface of the rotating assembly to create an electromagnetic force when an electric current is applied to the coil core from an outside; and a valve assembly including a switch valve provided to be able to ascend or descend inside the fluid storage chamber and, when descending, closing a fluid outlet formed in a side wall of the fluid storage chamber, an elastic means including a side coupled with the main body and an opposite side coupled with the switch valve to apply a downward elastic force to the switch valve, and a magnetic plate fastened to an upper surface of the elastic means and, when an electromagnetic force is created from the coil core, pulled towards the coil core. The valve assembly opens the fluid outlet when an electric current is applied to the coil core and closes the fluid outlet when the application of the electric current to the coil core is released.

The rotating assembly includes a cover plate fastened to an upper side of the main body to cover the opening of the fluid storage chamber, an internal ring mounted on an upper surface of the cover plate to surround the driving shaft, and an external ring spaced apart from the internal ring and surrounding the internal ring. The coil core is seated between the internal ring and the external ring on the upper surface of the cover plate.

The internal ring and the external ring are formed of a magnetic material, and the cover plate is formed of a non-magnetic material. The magnetic plate is located in a position corresponding to an area between the internal ring and the external ring.

The external ring includes a plurality of protrusions projecting upwards. A distance between the plurality of protrusions is set to be constant. The viscous clutch further comprises a sensor assembly measuring the number of changes in magnetic field when the external ring rotates.

Two or more fluid outlets are formed in the side wall of the fluid storage chamber. The switch valve includes a valve block seated on a bottom surface of the fluid storage chamber to cover each of the two or more fluid outlets and an inserting protrusion projected downwards from a lower end of the valve block and, when the valve block is seated on the bottom surface of the fluid storage chamber, inserted to pass through the bottom surface of the fluid storage chamber. The elastic means includes a center ring fastened to the main body to surround the driving shaft and two or more leaf springs radially extending from the center ring and having ends each of which is inserted to a respective one of the two or more valve blocks to apply an elastic force to the valve block to close the fluid outlets unless a separate external force is applied otherwise.

The switch valve further includes a connecting ring connecting the two or more valve blocks.

A plurality of through holes are formed in the magnetic plate.

Advantageous Effects

The viscous clutch according to the present invention may stably open and close the fluid outlet by the electromagnetic force of an electromagnet without the need for a separate permanent magnet and provide enhanced opening/closing reliability of fluid outlet.

MODE FOR CARRYING OUT THE INVENTION

Hereinafter, embodiments of a viscous clutch according to the present invention are described in detail with reference to the accompanying drawings.

Figure 1:
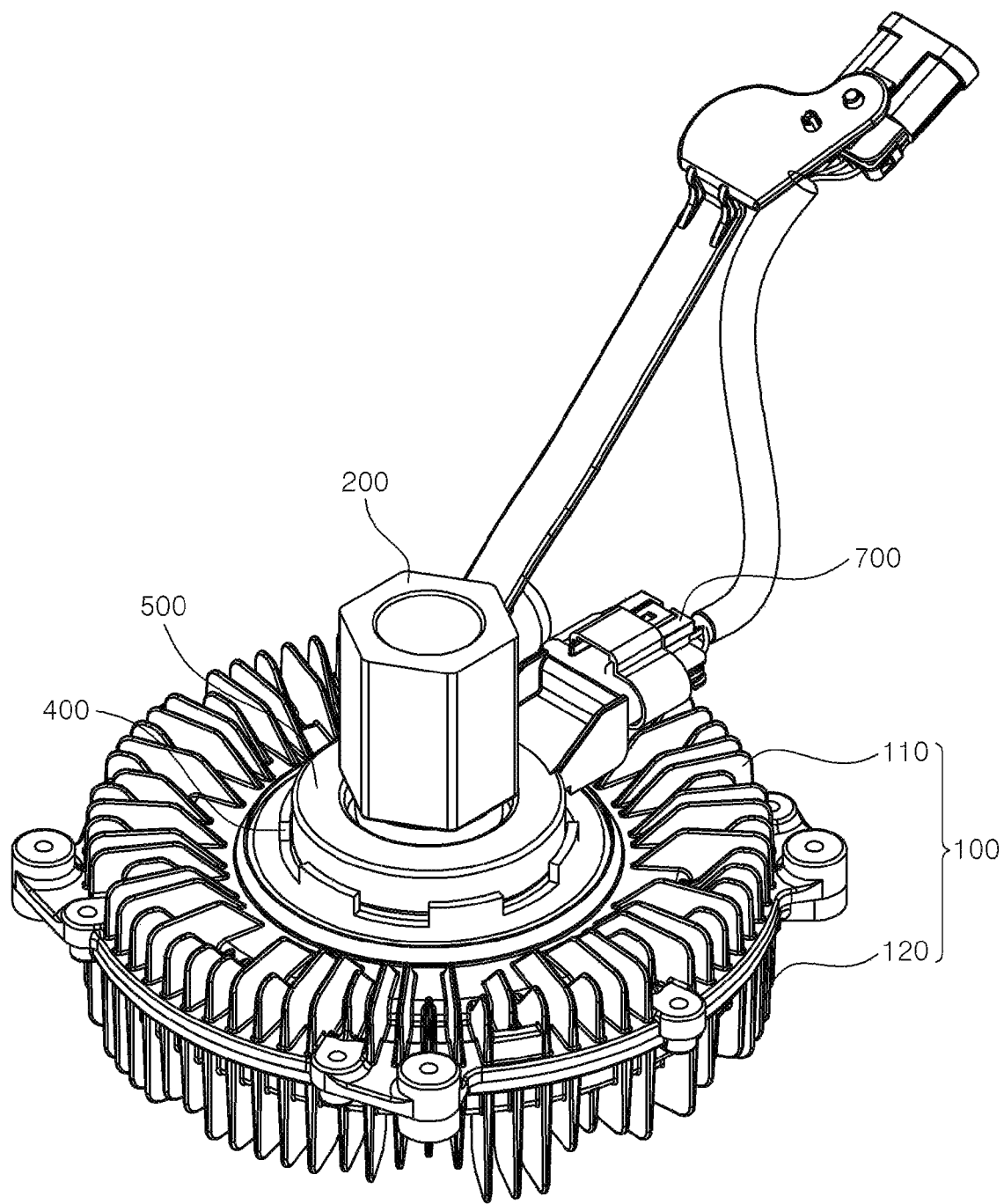
FIG. 1 is a perspective view illustrating a viscous clutch according to the present invention.
Figure 2:
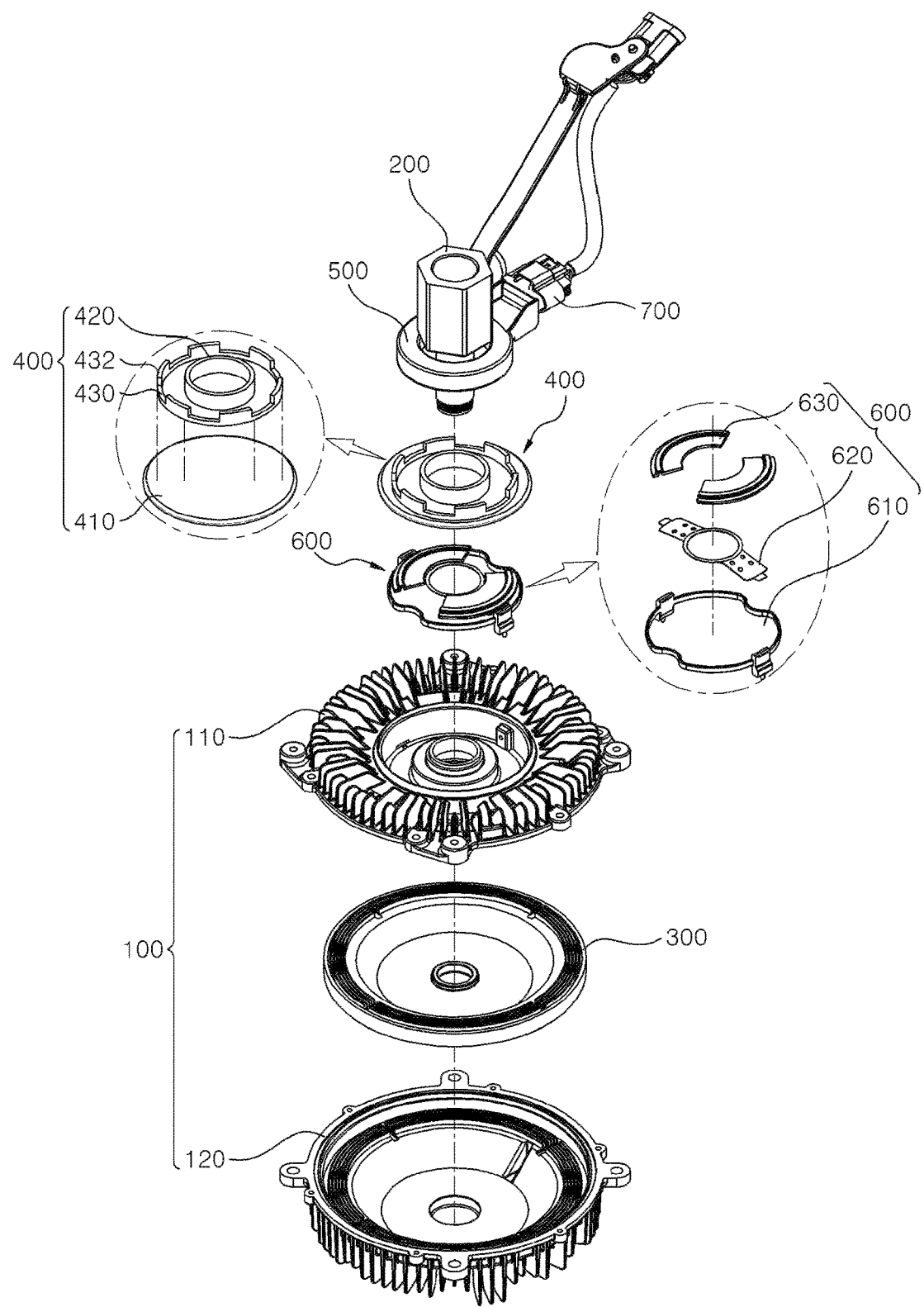
FIG. 2 is an exploded perspective view illustrating a viscous clutch according to the present invention.
Figure 3:
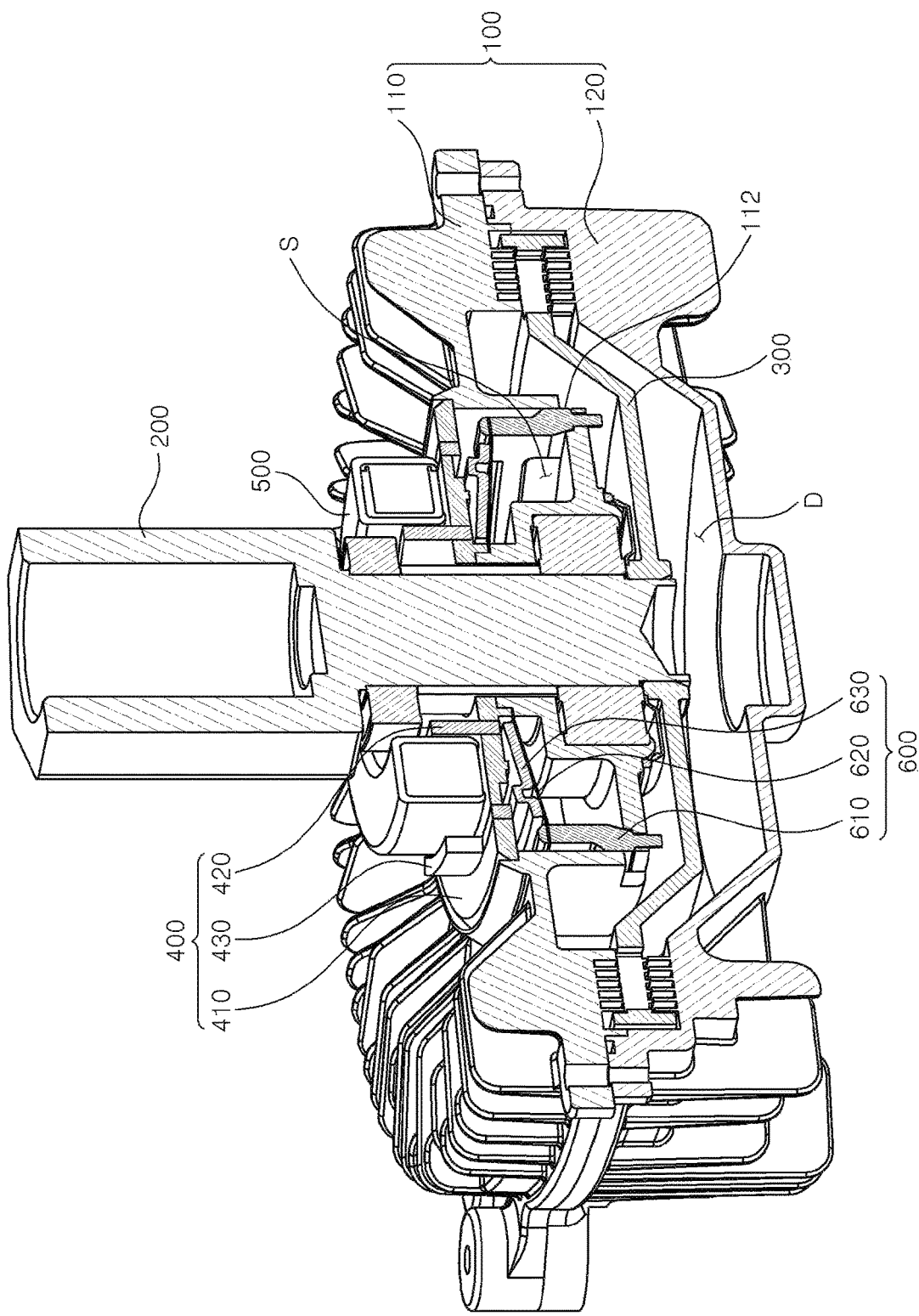
FIG. 3 is a perspective cross-sectional view illustrating a viscous clutch according to the present invention.
Figure 4:
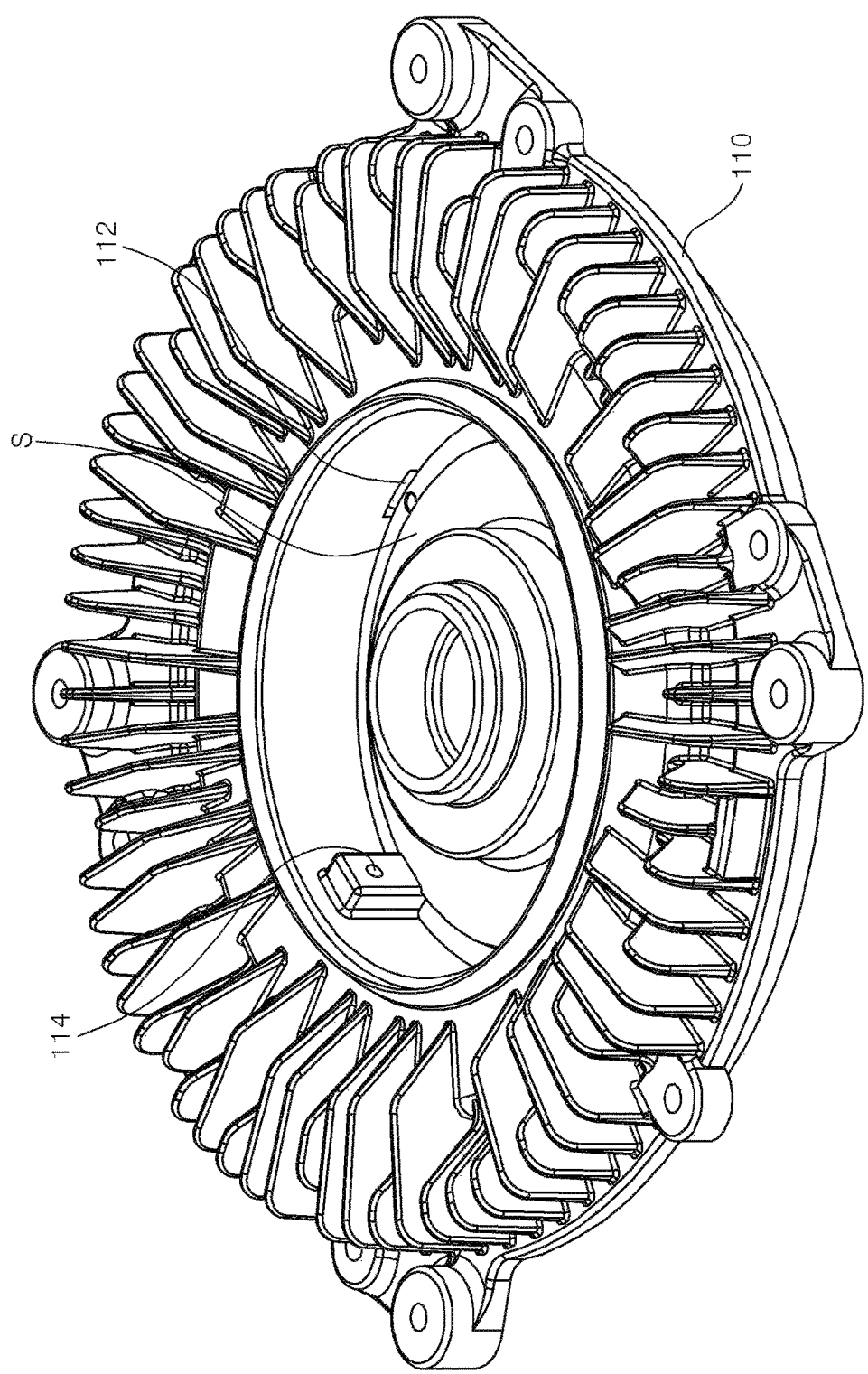
FIG. 4 is a perspective view illustrating a main body of a viscous clutch according to the present invention.

FIGS. 1 to 3 are a perspective view, exploded perspective view, and perspective cross-sectional view of a viscous clutch according to the present invention. FIG. 4 is a perspective view of a main body included in a viscous clutch according to the present invention.

According to the present invention, a viscous clutch is a kind of power transmission device configured to be able to selectively transfer a rotating force created as a rotor 300 rotates about a driving shaft 200 to a fan housing 100. The viscous clutch of the present invention features the capability of stably opening and closing a fluid outlet 112 by an electromagnetic force from an electromagnet without a separate permanent magnet, as well as providing high reliability of opening and closing the fluid outlet 112.

In other words, a viscous clutch according to the present invention includes a fan housing 100 including a main body 110 having a concave fluid storage chamber S formed in a middle portion thereof and a cover 120 having a concave fluid operating chamber D formed in a middle portion thereof, wherein the main body 110 is laid over the cover 120 to cover an opening of the fluid operating chamber D; a driving shaft 200 extending in an upper or lower direction thereof and mounted for a lower end thereof to pass through a bottom plate of the main body 110; a rotor 300 fastened to a lower end of the driving shaft 200 to be able to rotate in the fluid operating chamber D; a rotating assembly 400 integrally coupled with the main body 110 to cover the opening of the fluid storage chamber S; a coil core 500 seated on an upper surface of the rotating assembly 400 to create an electromagnetic force when an electric current is applied to the coil core 500 from an outside; and a valve assembly 600 opening or closing a fluid outlet 112 depending on whether an electric current is applied to the coil core 500.

The fluid outlet 112 and a fluid return hole 114 are formed in the side wall of the fluid storage chamber S formed in the main body 110. The fluid in the fluid operating chamber D is introduced into the fluid storage chamber S through the fluid return hole 114, and the fluid in the fluid storage chamber S is fed into the fluid operating chamber D through the fluid outlet 112, and such a process is repeated. The fluid is introduced into the fluid operating chamber D, thus filling the space between the rotor 300 and the cover 120. In such a state, as the driving shaft 200 and the rotor 300 coupled to the driving shaft 200 rotate, the fan housing 100 is rotated along with the rotor 300. In contrast, if the fluid fills the fluid storage chamber S, the fluid does not fill the space between the rotor 300 and the fan housing 100. Therefore, in such a state, although the driving shaft 200 and the rotor 300 coupled to the driving shaft 200 rotate, the fan housing 100 is not rotated alongside the rotor 300 but rather remains still. As mentioned above, the structure of transferring or cutting off the rotating force of the rotor 300 to the fan housing 100 depending on whether fluid flows into the fluid storage chamber S is substantially the same as conventional viscous clutches, and no detailed description thereof is given below.

The valve assembly 600 includes a switch valve 610 provided to be able to ascend or descend inside the fluid storage chamber S and, when descending, closing a fluid outlet 112 formed in a side wall of the fluid storage chamber S, an elastic means 620 including a side coupled with the main body 110 and an opposite side coupled with the switch valve 610 to apply a downward elastic force to the switch valve 610, and a magnetic plate 630 fastened to an upper surface of the elastic means 620 and, when an electromagnetic force is created from the coil core 500, pulled towards the coil core 500. The valve assembly 600 opens the fluid outlet 112 when an electric current is applied to the coil core 500 and closes the fluid outlet 112 when the application of the electric current to the coil core 500 is released.

In such a configuration where the fluid outlet 112 is opened or closed depending on whether electric current is applied to the coil core 500, since the fluid outlet 112 is opened or closed immediately when the user selects the application of electric current, the transfer of rotating force from the rotor 300 to the fan housing 100 may be very quickly performed. Further, since the viscous clutch according to the present invention is configured so that when no separate external force is applied, i.e., when no electric current is applied to the coil core 500, the fluid outlet 112 is closed by the elastic force of the elastic means 620 and, when an electric current is applied to the coil core 500 to thereby generate an electromagnetic force, the valve assembly 600 is operated by the electromagnetic force of the coil core 500 to open the fluid outlet 112. This advantageously eliminates the need for a separate permanent magnet which is required for conventional viscous clutches.

That is, the viscous clutch of the present invention has a simplified internal structure and, thus, may be made compact at reduced costs.

Meanwhile, in order for the coil core 500 to be able to stably rest on the rotating assembly 400, the rotating assembly 400 includes a cover plate 410 fastened to an upper side of the main body 110 to cover the opening of the fluid storage chamber S, an internal ring 420 mounted on an upper surface of the cover plate 410 to surround the driving shaft 200, and an external ring 430 spaced apart from the internal ring 420 and surrounding the internal ring 420. The coil core 500 is preferably seated between the internal ring 420 and the external ring 430 on the upper surface of the cover plate 410.

At this time, for smooth creation of an electric field when electric current is applied to the coil core 500, the internal ring 420 and the external ring 430 are preferably formed of a magnetic material. However, even forming the cover plate 410 with a magnetic material may hamper smooth creation of electric induction between the internal ring 420 and the external ring 430. Thus, the cover plate 410 is preferably formed of a non-magnetic material, and the magnetic plate 630 is preferably provided in a position corresponding to a space between the internal ring 420 and the external ring 430 of the bottom surface of the cover plate 410.

Since the rotating assembly 400 is fastened to the main body 110 in the viscous clutch of the present invention, the rotating assembly 400 is the same in the number of rotations as the fan housing 100. Thus, in order to be able to calculate the number of rotations of the fan housing 100 by measuring the number of rotations of the rotating assembly 400, the external ring 430 includes a plurality of protrusions 432 projecting upwards, and the distance between the plurality of protrusions 432 is set to be constant, and the viscous clutch further comprises a sensor assembly 700 measuring the number of changes in magnetic field when the external ring 430 rotates.

If the height of the top surface of the external ring 430 is constant as in the internal ring 420, no variation in magnetic field occurs even during rotation. However, as a plurality of protrusions 432 are formed at the top surface of the external ring 430 as shown, the electric filed may be varied as many times as the number of the protrusions 432. For example, if the external ring 430 has six protrusions 432 as in the instant embodiment, then the magnetic field may be varied six times as the external ring 430 rotates once. Thus, the sensor assembly 700 may be set to determine that the external ring 430 and the fan housing 100 are rotated once when the electric field is varied six times.

The sensor assembly 700 for sensing variations in electric field are known for its various purposes in the art to which the present invention pertains, and no detailed description thereof is presented.

Figure 5:
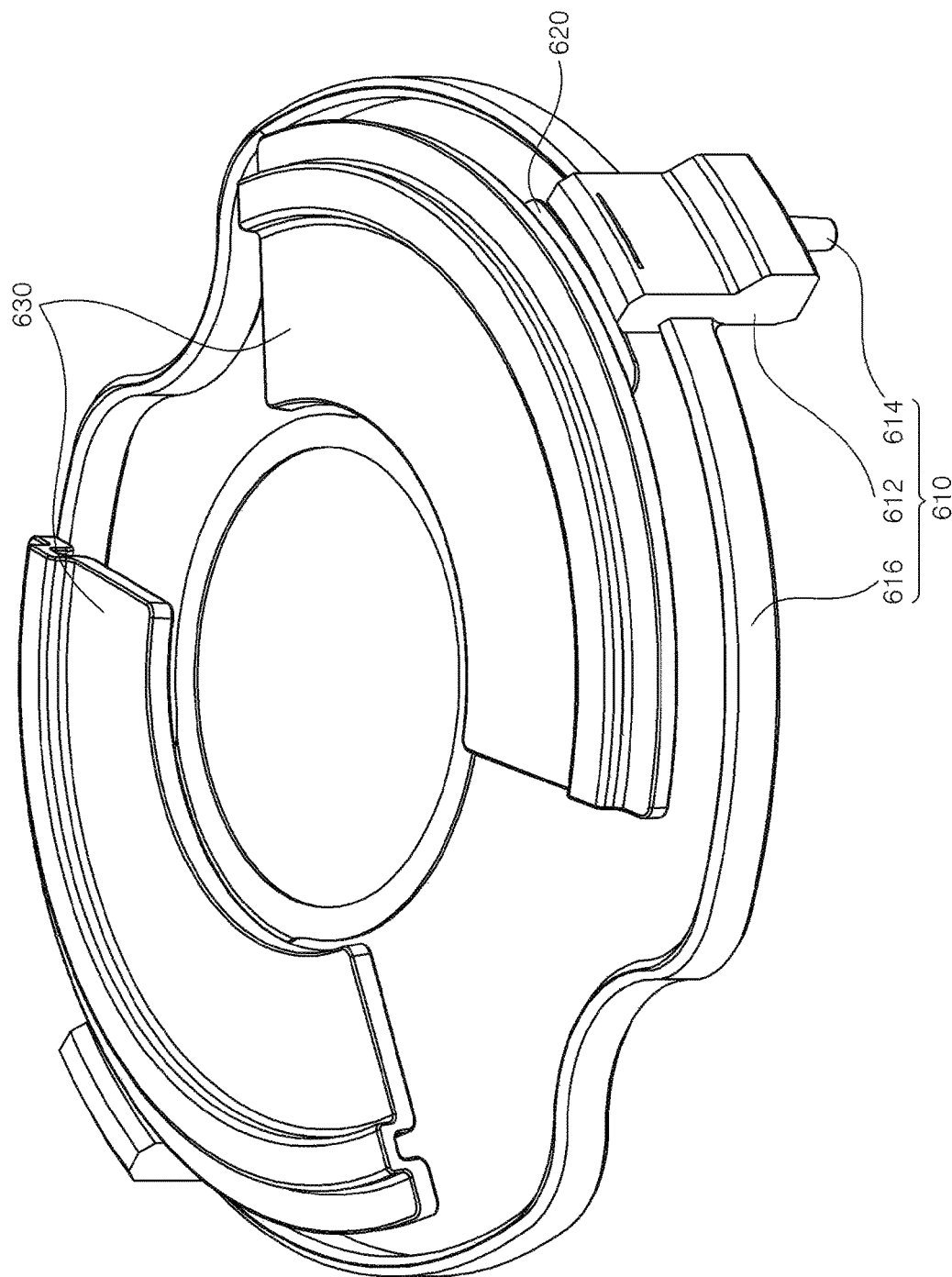
FIG. 5 is a perspective view illustrating a valve assembly of a viscous clutch according to the present invention.
Figure 6:
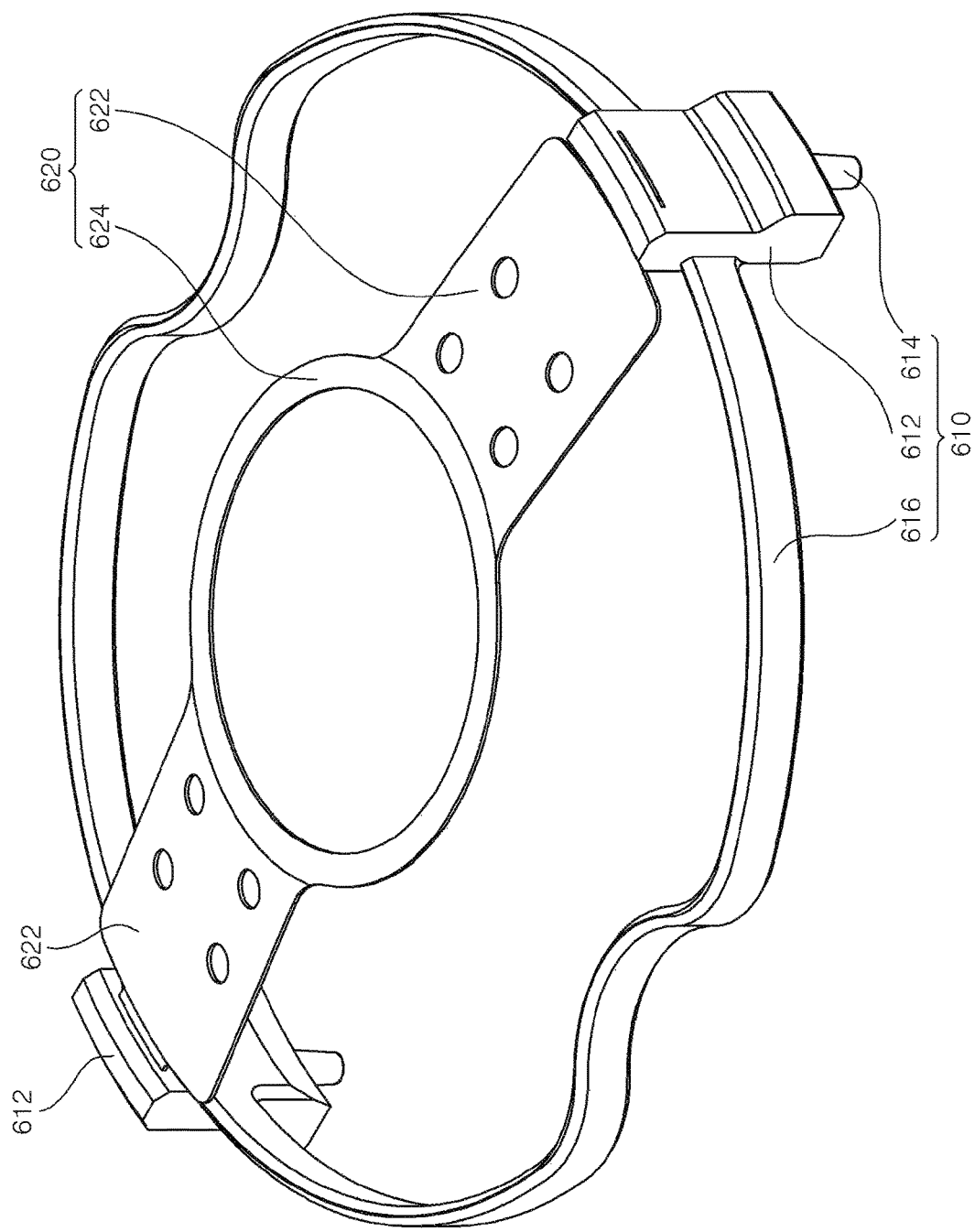
FIG. 6 is a perspective view illustrating a coupling structure of an elastic means and a switch valve.
Figure 7:
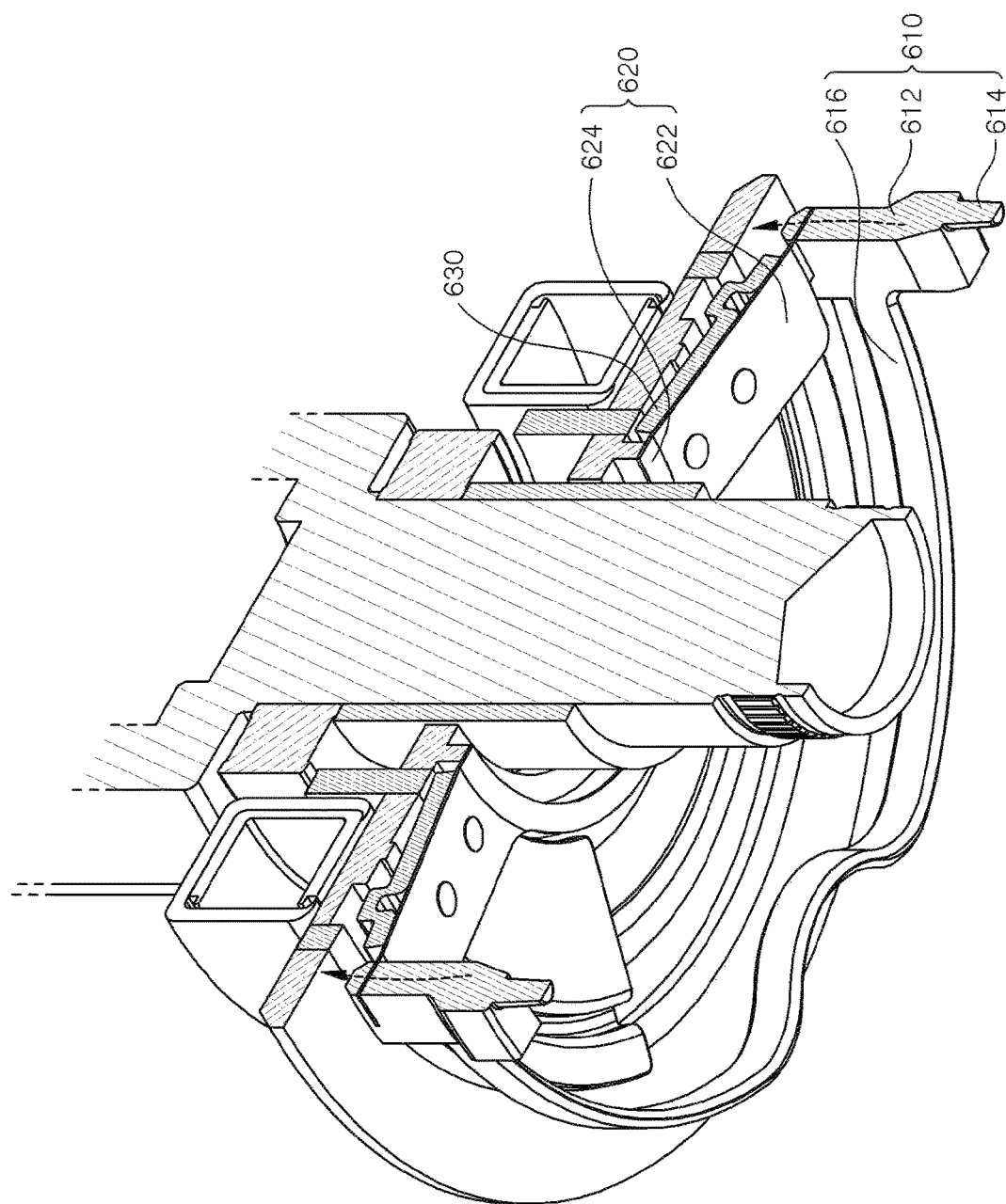
FIG. 7 is a perspective view illustrating a coupling structure of a rotating assembly and a valve assembly.

FIG. 5 is a perspective view illustrating a valve assembly 600 included in a viscous clutch according to the present invention. FIG. 6 is a perspective view illustrating a coupling structure of a switch valve 610 and an elastic means 620. FIG. 7 is a perspective view illustrating a coupling structure of a rotating assembly 400 and a valve assembly 600.

The viscous clutch according to the present invention is configured to keep the fluid outlet 112 in a closed state by the elastic force of the elastic means 620. Since the elastic means 620 is formed of metal, e.g., carbon steel, if the elastic means 620 is configured to directly cover the fluid outlet 112, the fluid outlet 112 might not be sealed off in a stable manner.

Accordingly, the viscous clutch of the present invention is configured to allow the switch valve 610 pressurized downwards by the elastic means 620 to block the fluid outlet 112. To further ensure that the fluid outlet 112 is sealed off, the switch valve 610 includes a valve block 612 seated on the bottom surface of the fluid storage chamber S to cover each fluid outlet 112 and an inserting protrusion 614 inserted to pass through the bottom surface of the fluid storage chamber S when the valve block 612 is seated on the bottom surface of the fluid storage chamber S. If the inserting protrusion 614 is so formed in the valve block 612, then the valve block 612 is not moved aside but only up or down when pressurized downwards by the elastic force of the elastic means 620.

Where two or more fluid outlets 112 are formed in the side wall of the fluid storage chamber S as many valve blocks 612 as the number of the fluid outlets 112 need to be provided, and the elastic means 620 needs to be configured to simultaneously pressurizes downwards the two or more valve blocks 612. Therefore, the elastic means 620 preferably includes a center ring 624 fastened to the main body 110 to surround the driving shaft 200 and two or more leaf springs 622 radially extending from the center ring 624 and having ends each of which is inserted to a respective one of the two or more valve blocks 612 to apply an elastic force to the valve block 612 to close the fluid outlets 112 unless a separate external force is applied otherwise. For example, where two fluid outlets 112 are formed as in the instant embodiment, two valve blocks 612 and two leaf springs 622 are required.

For the two or more valve blocks 612 to be able to move up or down together as one piece, the switch valve 610 may further include a connecting ring 616 to connect the two or more valve blocks 612. As such, if the two or more valve blocks 612 are connected together as one piece by the connecting ring 616, although each leaf spring 622 has a different elastic force, all of the valve blocks 612 may be moved up or down as one piece, thus simultaneously opening or closing all the fluid outlets 112.

Meanwhile, the magnetic plate 630 is preferably formed in a plate shape to make sure that it may be moved up or down by the electromagnetic force created from the coil core 500. In the state of the whole inside of the fluid storage chamber S being filled with the fluid, the ascending or descending of the magnetic plate 630 may be resisted by the fluid.

In the viscous clutch according to the present invention, a plurality of through holes (not shown) may be formed in the magnetic plate 630 to mitigate fluid resistance against the ascending or descending of the magnetic plate 630. The number, shape, and array pattern of the through holes may be varied depending on a diversity of conditions, and no detailed description thereof is given.

Figure 8:
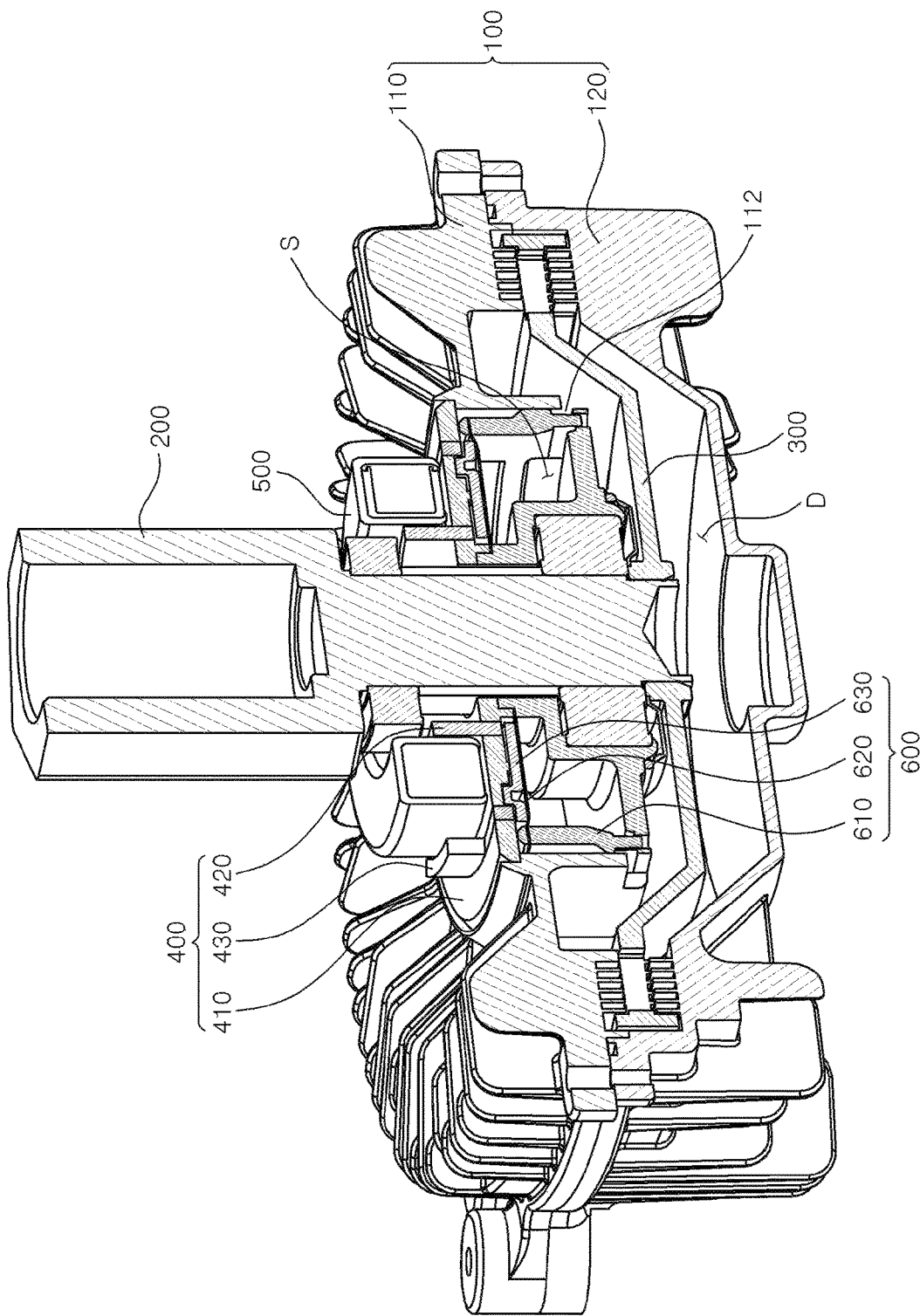
FIG. 8 is a view illustrating a state of using a viscous clutch according to the present invention.

FIG. 8 is a view illustrating the state of use of a viscous clutch according to the present invention.

In the viscous clutch according to the present invention, the valve block 612 is elastically pressurized downwards by the elastic means 620 so that the inserting protrusion 614 is inserted into the fluid outlet 112, i.e., the fluid outlet 112 remains sealed off as shown in FIG. 3 while no electric current flows across the coil core 500.

If an electric current applies to the coil core 500, attraction occurs between the coil core 500 and the magnetic plate 630 and, thus, the switch valve 610 and the elastic means 620 integrally coupled with the magnetic plate 630 ascend towards the coil core 500 as shown in FIG. 8. If the switch valve 610 overall ascends, the inserting protrusion 614 formed in the lower end of the valve block 612 is pulled out from the fluid outlet 112 and, thus, the fluid outlet 112 turns into an open state so that the fluid filling the fluid storage chamber S may be introduced into the fluid operating chamber D.

In contrast, if the application of electric current to the coil core 500 is cut off in the state shown in FIG. 8, attraction between the coil core 500 and the magnetic plate 630 is released so that the switch valve 610 may be pressurized downwards by the elastic force of the elastic means 620, i.e., the fluid outlet 112 is sealed off as shown in FIG. 3.

As set forth above, the viscous clutch according to the present invention may immediately switch between the opening and closing of the fluid outlet 112 depending on whether to apply electric current to the coil core 500 and eliminate the need for a separate permanent magnet with the result of a simplified internal structure.

Although the present invention has been described in connection with preferred embodiments thereof, the scope of the present invention is not limited to particular embodiments but should rather be interpreted by the appended claims. It should be appreciated by one of ordinary skill in

[Description of Symbols]

| | |
|---|---|
| 100: fan housing | 110: main body |
| 112: fluid outlet | 114: fluid return hole |
| 120: cover | 200: driving shaft |
| 300: rotor | 400: rotating assembly |
| 410: cover plate | 420: internal ring |
| 430: external ring | 432: protrusion |
| 500: coil core | 600: valve assembly |
| 610: switch valve | 612: valve block |
| 614: inserting protrusion | 616: connecting ring |
| 620: elastic means | 622: leaf spring |
| 624: center ring | 630: magnetic plate |
| 700: sensor assembly | D: fluid operating chamber |
| S: fluid storage chamber | |

The invention claimed is:

1. A viscous clutch, comprising:
a fan housing (100) including a main body (110) and a cover (120), the main body (110) including a fluid storage chamber (S) formed in a middle portion thereof and a fluid outlet (112) and a fluid return hole (114) formed in a side wall of the fluid storage chamber (S), the cover (120) including a concave fluid operating chamber (D) formed in a middle portion thereof, the main body (110) laid over the cover (120) to cover an opening of the fluid operating chamber (D);
a driving shaft (200) extending in an upper or lower direction thereof and mounted to pass through a bottom plate of the main body (110);
a rotor (300) fastened to a lower end of the driving shaft (200) to be able to rotate in the fluid operating chamber (D);
a rotating assembly (400) integrally coupled with the main body (110) to cover the opening of the fluid storage chamber (S);
a coil core (500) seated on an upper surface of the rotating assembly (400) to create an electromagnetic force when an electric current is applied to the coil core (500) from an outside; and
a valve assembly (600) including a switch valve (610) provided to be able to ascend or descend inside the fluid storage chamber (5) and, when descending, closing a fluid outlet (112) formed in a side wall of the fluid storage chamber (S), an elastic means (620) including a side coupled with the main body (110) and an opposite side coupled with the switch valve (610) to apply a downward elastic force to the switch valve (610), and a magnetic plate (630) fastened to an upper surface of the elastic means (620) and, when an electromagnetic force is created from the coil core (500), pulled towards the coil core (500), wherein the valve assembly (600) opens the fluid outlet (112) when an electric current is applied to the coil core (500) and closes the fluid outlet (112) when the application of the electric current to the coil core (500) is released.

2. The viscous clutch of claim 1, wherein the rotating assembly (400) includes a cover plate (410) fastened to an upper side of the main body (110) to cover the opening of the fluid storage chamber (S), an internal ring (420) mounted on an upper surface of the cover plate (410) to surround the driving shaft (200), and an external ring (430) spaced apart from the internal ring (420) and surrounding the internal ring (420), wherein the coil core (500) is seated between the internal ring (420) and the external ring (430) on the upper surface of the cover plate (410).

3. The viscous clutch of claim 2, wherein the internal ring (420) and the external ring (430) are formed of a magnetic material, and the cover plate (410) is formed of a non-magnetic material, and wherein the magnetic plate (630) is located in a position corresponding to an area between the internal ring (420) and the external ring (430).

4. The viscous clutch of claim 3, wherein the external ring (430) includes a plurality of protrusions (432) projecting upwards, wherein a distance between the plurality of protrusions (432) is set to be constant, and wherein the viscous clutch further comprises a sensor assembly (700) measuring the number of changes in magnetic field when the external ring (430) rotates.

5. The viscous clutch of claim 1, wherein two or more fluid outlets (112) are formed in the side wall of the fluid storage chamber (S), wherein the switch valve (610) includes a valve block (612) seated on a bottom surface of the fluid storage chamber (S) to cover each of the two or more fluid outlets (112) and an inserting protrusion (614) projected downwards from a lower end of the valve block (612) and, when the valve block (612) is seated on the bottom surface of the fluid storage chamber (S), inserted to pass through the bottom surface of the fluid storage chamber (S), and wherein the elastic means (620) includes a center ring (624) fastened to the main body (110) to surround the driving shaft (200) and two or more leaf springs (622) radially extending from the center ring (624) and having ends each of which is inserted to a respective one of the two or more valve blocks (612) to apply an elastic force to the valve block (612) to close the fluid outlets (112) unless a separate external force is applied otherwise.

6. The viscous clutch of claim 5, wherein the switch valve (610) further includes a connecting ring (616) connecting the two or more valve blocks (612).

7. The viscous clutch of claim 6, wherein a plurality of through holes are foamed in the magnetic plate (630).

* * * * *